Patented Oct. 27, 1925.

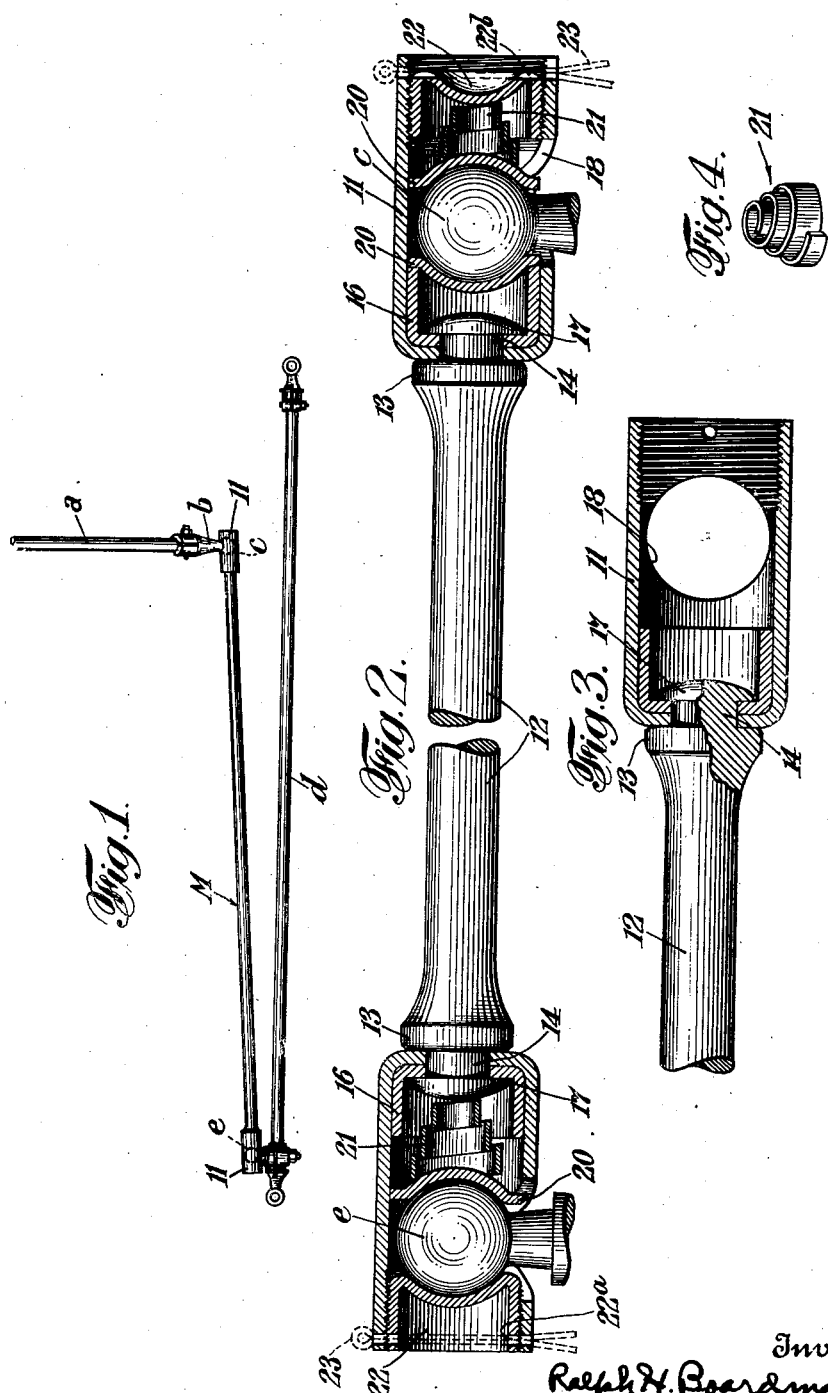

1,559,402

UNITED STATES PATENT OFFICE.

RALPH H. BOARDMAN, OF NEW BRITAIN, CONNECTICUT, ASSIGNOR TO THE STANLEY WORKS, A CORPORATION OF CONNECTICUT.

AUTOMOBILE STEERING CONNECTION AND METHOD OF MAKING THE SAME.

Application filed June 15, 1922. Serial No. 568,391.

*To all whom it may concern:*

Be it known that I, RALPH H. BOARDMAN, a citizen of the United States, a resident of New Britain, in the county of Hartford and State of Connecticut, have invented a certain new and useful Improvement in Automobile Steering Connections and Methods of Making the Same, of which the following is a specification.

This invention relates to steering connections for automobiles, and more particularly to the drag links and ball and socket arrangements thereof. The object of the invention is to provide a structure of this sort which is simple in construction, economic in manufacture, and strong, durable and efficient in use.

In the accompanying drawings, wherein the preferred embodiment of the invention is shown,—

Figure 1 is a view of a steering connection in which the improvements of the present invention are incorporated;

Fig. 2 is a view of a drag link, the ball and socket arrangements on the ends thereof being in central longitudinal section;

Fig. 3 is a central longitudinal section through one end of the drag link, the removable parts within the socket member thereof being omitted, and Fig. 4 is an elevational view of a spring employed in each of the ball and socket connections.

In the arrangement shown in Fig. 1, which is merely disclosed to illustrate one application of the present invention, *a* is the steering post carrying at its lower end a steering arm *b* provided with a ball *c*; *d*, a connecting rod having a yoke member at each end adapted to be pivotally secured to the knuckles of the steering wheels; *e*, a ball carried by the connecting rod *d*; and M designates the drag link having at each end a socket member 11 adapted to receive balls *c* and *e*, as hereinafter described more in detail.

The construction of the drag link M forms an important feature of the present invention. This drag link includes a rod 12 having at each end an abutment or rib 13 and a projecting stud 14. Preferably, the rod 12 is of wrought metal and is constructed from a rod of like diameter throughout its length. The ribs 13 by preference are formed by swaging, this being accomplished, if desired, by applying a pair of dies to opposite sides of the portion to be swaged and then bringing the dies together to head up the portion between the dies. The numeral 11 designates a socket member preferably constructed of wrought metal and formed by stamping out a blank and then drawing the same to the shape shown. The end wall of this socket member has an opening which closely receives the projecting stud 14. The numeral 16 designates a reinforcing cup preferably of wrought metal and formed by stamping and drawing operations. This reinforcing cup, which is of such size and shape as to fit snugly within the closed end of the socket member 11, has an opening in its closed end adapted to closely receive the stud 14. The socket member and the cup are secured on the stud 14 by heading the outer end of the latter, as at 17. This heading operation is such that the end walls of the socket member and the cup are tightly clamped or jammed between the head 17 and the shoulder or rib 13 thereby obtaining great rigidity and strength. The cup 16 is of advantage in that it reinforces the socket member, facilitates securing the latter in position on the stud 14, and the edge thereof may form a seat for a bearing member, as hereinafter described. In the side wall of the socket member is an opening 18 through which is inserted the ball *c* or the ball *e*, as the case may be.

The ball and socket connections at the ends of the drag link also have features of novelty and advantage. Within each of the socket members 11 is, at least, one bearing member 20 in the form of a concavo-convex disk engaging the ball, a spiral spring 21 resiliently maintaining the disk 20 against the ball, and a nut 22 threaded into the open end of the socket member. In the arrangement on the left-hand end of the drag link, the closed end of the nut 22 and the disk 20 form a socket, so to speak, for the ball *e*, the spring 21 being positioned between the disk 20 and the closed end of the socket member 11. In the arrangement on the right-hand end of the drag link, the ball *c* is positioned in the socket formed by a pair of disks 20, one of these disks being seated against the shoulder provided by the outer end of the cup 16 and the other disk being resiliently urged against the ball by the spiral spring 21 positioned within the nut 22. As herein shown, the spring 21 is formed from a strip of metal rectangular in cross-section wound into a spiral with each successive convolution partly within the next preceding convolution and with the width of the strip extending generally in the direction of the axis of the spring. A spring of this kind is of advantage in that it is extremely strong and takes up but very little space. The nuts 22 are preferably formed by drawing a piece of sheet metal to the shape shown, the closed end of the nut being dished so that it may form a spherical bearing surface for a ball. When the nut 22 is to be used as shown in the left-hand side of Fig. 2, the kerf 22$^a$ is in the skirt of the nut, and when used as shown in the right-hand side the kerf 22$^b$ is in the closed end of the nut, said kerfs being for the purpose of receiving cotter pins 23 (shown by dotted lines Fig. 2) which may be employed to prevent accidental displacement of the nuts 22.

It is, of course, obvious that the invention is susceptible of various modifications and changes which are within the spirit of the invention without departing from the scope of the following claims, it being understood that the present disclosure of the invention is by way of illustration only and it is not to be taken as restrictive of my conception.

I claim—

1. A part for automobile steering connections comprising a metal link-section and a member formed from sheet metal and non-integral with the link-section but attached thereto for containing a bearing.

2. A drag-link for automobile steering connections comprising a metal rod and a member formed from sheet metal and non-integral with the rod but attached to said rod and complemental ball-bearing parts contained in said member.

3. A drag-link for automobile steering connections comprising a metal rod and a member formed from sheet metal and non-integral with the rod but rigidly attached to said rod for containing a bearing.

4. A drag-link for automobile steering connections comprising a metal rod and a drawn sheet metal member non-integral with the rod but secured thereto for containing a bearing.

5. A drag-link for automobile steering connections comprising a metal rod and a drawn metal cup for a bearing, said cup being rigidly fastened on the end of the said rod.

6. A drag-link for automobile steering connections comprising a bar having a shoulder and a headed stud projecting therefrom and a drawn metal cup surrounding said stud and rigidly held by said shoulder and head.

7. A drag-link for use in automobile steering connections comprising a rod having adjacent one end, at least, an abutment and an end stud projecting beyond said abutment, a socket member having an end wall provided with an aperture receiving said stud, and a reinforcing cup fitting snugly within said socket member and having an apertured end wall receiving said stud, the end of said stud being headed over said end wall of said cup to securely clamp the end walls of said socket member and cup between the headed portion and abutment.

8. A drag-link for use in automobile steering connections comprising a rod of wrought metal having at each end a swaged up abutment and a projecting stud, a drawn metal socket member having an apertured end wall receiving said stud and abutting said abutment, and a headed up portion on the end of said stud for securing said socket member in place.

9. That improvement in the art of drag-links for use in automobile steering connections which consists of a rod formed from a rod of uniform diameter and having a portion slightly spaced from one end swaged up to form an abutment and an end stud, a drawn socket member of wrought metal having an end wall provided with an opening receiving said stud, and a drawn reinforcing cup of wrought metal fitting snugly within the inner end of said socket member and having an end wall provided with an opening receiving said stud, the outer end of said stud being swaged to form a head between which and said abutment, said end walls of said socket member and cup are securely clamped.

10. A drag-link for automobile steering connections comprising a rod having at each end a swaged shoulder and a stud projecting therefrom, a drawn metal cup having a hole in its bottom through which said stud projects, a head being swaged on said stud and rigidly holding said cup against said shoulder.

11. A drag-link for automobile steering connections comprising a link-section and a drawn sheet metal member for containing a bearing, said member being separate from but secured to said link-section.

12. A drag-link for automobile steering connections comprising a link-section and a drawn metal member for containing a bearing, said link-section having a head within said member for securing said parts together.

13. A drag-link for automobile steering connections comprising a link-section and a drawn metal member non-integrally connected thereto for containing a bearing, one of said parts having an integral portion for preventing the other part from moving relative thereto longitudinally.

14. A drag-link for automobile steering connections comprising a link-section and a metal member non-integrally connected thereto for containing a bearing, said parts having integral engaging portions for preventing relative longitudinal movement.

15. A drag-link for automobile steering connections comprising a link-section and a drawn metal cup non-integrally attached thereto for containing a bearing.

16. The method of making a drag-link for automobile steering connections comprising drawing up a metal member for containing a bearing, and securing it to a link-section by deforming the metal of one of said parts.

17. The method of making automobile steering connections comprising suitably shaping a link-section, drawing up a sheet metal member for containing a bearing and non-integrally securing said parts together.

18. The method of making automobile steering connections comprising suitably shaping a rod, drawing up a sheet metal member for containing a bearing and non-integrally but rigidly securing said parts together.

19. The method of making automobile steering connections comprising forming a stud on the end of a rod, drawing up a sheet metal member for containing a bearing and providing said part with a hole adapted to fit said stud and heading over said stud on the inside of said member to secure the latter to the rod.

20. The method of making automobile steering connections comprising providing a rod with a shoulder and stud, drawing up into cup-shape a member for containing a bearing, and providing said member with a hole in its bottom that is adapted to fit said stud, and forming a head on said stud on the inside of said cup, so as to clamp the bottom of said cup against said shoulder.

21. A drag-link comprising a body member, and a tubular end socket member, said tubular socket member having a restricted end portion fitting over said body member, said body member having an enlarged end within said tubular member fitting within the internal shoulder at the inner end of said restricted portion, said body member having an additional shoulder engaging the restricted portion of said socket member.

In testimony that I claim the foregoing, I have hereunto set my hand this 6 day of June, 1922.

RALPH H. BOARDMAN.